Dec. 7, 1965   C. V. PRESTOWITZ   3,222,594
EDDY CURRENT TESTING METHOD OF DISTINGUSHING SIMILAR
WELDING ELECTRODES HAVING DISSIMILAR COATINGS
Filed March 29, 1962
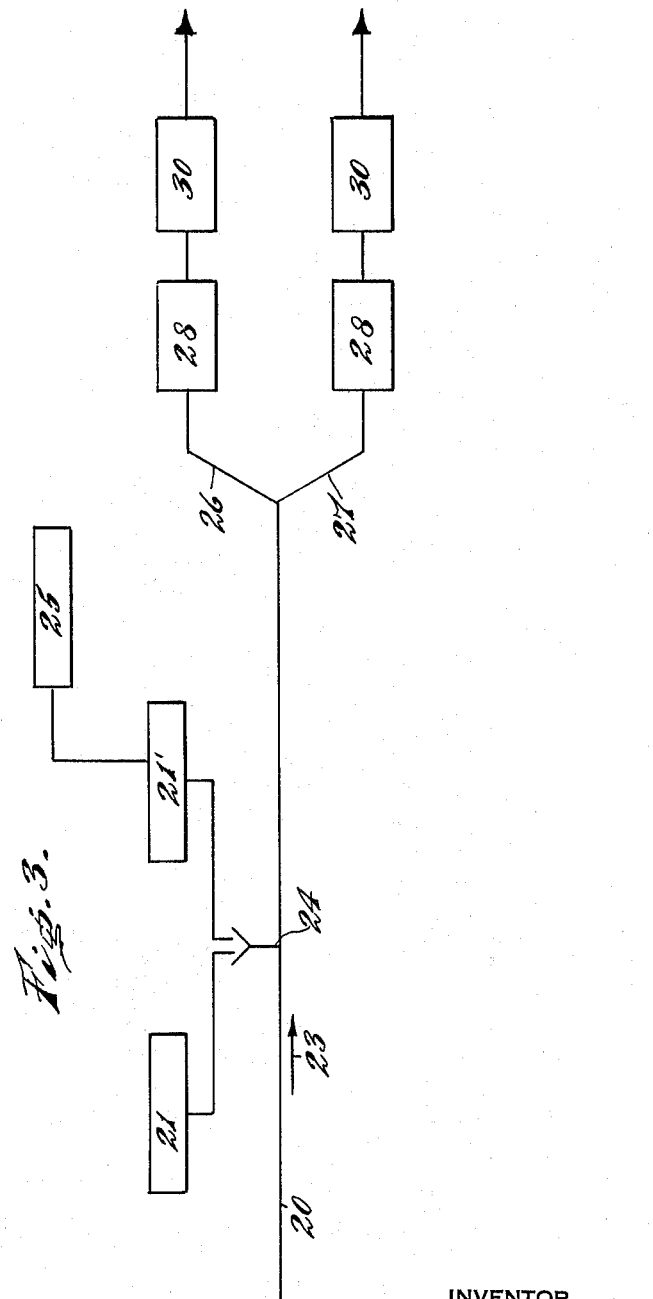
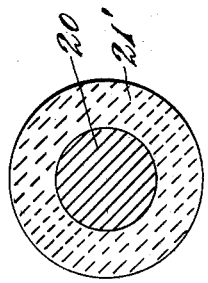
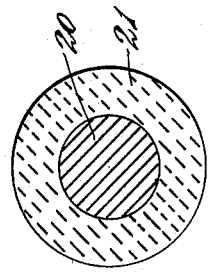
INVENTOR
Clyde V. Prestowitz
BY
ATTORNEYS

United States Patent Office 3,222,594
Patented Dec. 7, 1965

3,222,594
EDDY CURRENT TESTING METHOD OF DISTINGUISHING SIMILAR WELDING ELECTRODES HAVING DISSIMILAR COATINGS
Clyde V. Prestowitz, Wilmington, Del., assignor to Arcos Corporation, Philadelphia, Pa., a corporation of Pennsylvania
Filed Mar. 29, 1962, Ser. No. 183,627
4 Claims. (Cl. 324—40)

The present invention relates to methods of identifying welding electrodes which otherwise might be indistinguishable, particularly under eddy current testing.

A purpose of the invention is to distinguish by eddy current testing between two electrodes which have the same composition of core wire, where the difference in the composition of the coating is not normally sufficient to distinguish.

A further purpose is to distinguish electrodes for welding stainless steel by deliberately introducing into said electrode from 3 to 10% of iron powder as a tracer.

A further purpose is to add iron powder as a tracer in the coating of welding electrodes where the coating contains columbium suitably in the form of ferrocolumbium.

Further purposes appear in the specification and in the claims.

The drawings are diagrammatic and are merely intended to facilitate explanation of the invention.

FIGURE 1 and FIGURE 2 are both cross sections of similar welding electrodes, the proportion of core wire and coating not intended to be representative but merely to suggest that each feature is present.

FIGURE 3 is a schematic diagram of one type of flow arrangement involving the invention.

In producing welding electrode, particularly in the stainless steel welding practice, especially for electric arc welding, it is common to use the same core wire composition for welding electrodes which are to produce different analyses.

In many applications, such as nuclear submarine construction, the analyses is critical, and use of the wrong electrode can result in a weld which, if undetected and unremedied, could lead to disastrous results. Hence, it becomes important to be able to identify with certainty the electrode analyses prior to use. No such certain method of identity between certain electrodes was available in the prior art, where the core wire was the same, and conventional testing, such as eddy current testing or visual observation, was unable to distinguish the difference in the composition of the coating. Thus, even where best efforts were exerted during production of the electrodes to keep them separate, there was no certain way to detect any difference in the event an undetected mix-up occurred.

By means of the present invention, eddy currents can be used to detect any possible mix-up, and the finished electrodes can be accurately checked to see that they are properly identified.

The different analyses are obtained by adding different alloying ingredients to the coating in addition to the fluxing ingredients which will normally be used.

Thus, for example in electrodes for producing weld metal of stainless steel Type 308 and of stainless steel Type 347, it is common to use stainless steel Type 308 core wire but to add columbium in the form of ferrocolumbium to the Type 347 electrode coating and omit the ferrocolumbium from the Type 308 electrode coating.

The core wire may be of standard Type 308 analysis but typically in the preferred form will have an analysis as follows in both cases:

| | Percent |
|---|---|
| Carbon _____ maximum__ | 0.06 |
| Manganese _____ | 1.25-2.00 |
| Silicon _____ maximum__ | 0.50 |
| Sulfur _____ do____ | 0.025 |
| Phosphorus _____ do____ | 0.025 |
| Chromium _____ | 20.0 to 21.5 |
| Nickel _____ | 9.5-11.0 |
| Columbium _____ | Substantially 0 |

Other alloy residual totalling 0.50% maximum

Various types of fluxes may be used and by giving the examples below it is not intended to limit to any particular types of fluxes. I illustrate one character of flux which employs titanium as its active ingredient and another type of flux which employs lime as its active ingredient. I also in each case illustrate alloying additions such as ferrosilicon, ferrochromium, manganese and in some cases ferrocolumbium.

Each of the examples gives a range of flux composition in percent for the Type 308 electrode and also for various sizes of Type 347 electrodes, it being understood that the variation with size is merely a refinement which need not be followed unless desired.

In each of the type 347 electrodes I employ 3 to 10% and preferably 5% of iron powder.

*Example 1*

| | Titania Coating | | | |
|---|---|---|---|---|
| | 308 Electrode All sizes | 347 Electrodes | | |
| | | 3/16 5/64 3/32 | 1/8 5/32 | 3/16 1/4 |
| Calcium carbonate_____ | 23 | 22 | 21 | 20 |
| Calcium fluoride_____ | 9 | 8 | 8 | 8 |
| Rutile_____ | 31 | 29 | 28 | 26 |
| Potassium titanate_____ | 10 | 9 | 9 | 9 |
| Bentonite_____ | 3 | 3 | 3 | 3 |
| Ferrosilicon (50% Si)_____ | 3 | 1 | 1 | 1 |
| Ferrochromium (70% Cr)___ | 5 | 4 | 4 | 4 |
| Electrolytic manganese____ | 4 | 3 | 3 | 3 |
| Ferrocolumbium (55% Cb)_ | | 5 | 7 | 10 |
| Iron Powder_____ | | 5 | 5 | 5 |
| Potassium silicate_____ | 12 | 11 | 11 | 11 |
| Total_____ | 100 | 100 | 100 | 100 |

It has been found that the presence of the 5% of iron powder makes it possible to readily distinguish the Type 308 from all of the Type 347 electrodes referred to in Example 1.

*Example 2*

| | Lime Coating | | | |
|---|---|---|---|---|
| | 308 Electrode All sizes | 347 Electrodes | | |
| | | 3/16 5/64 3/32 | 1/8 5/32 | 3/16 1/4 |
| Calcium carbonate_____ | 39 | 35 | 34 | 32 |
| Calcium fluoride_____ | 39 | 35 | 34 | 32 |
| Bentonite_____ | 3 | 3 | 3 | 3 |
| Ferrosilicon (50% Si)_____ | 4 | 2 | 2 | 2 |
| Electrolytic manganese____ | 3 | 3 | 3 | 3 |
| Ferrocolumbium (55% Cb)_ | | 6 | 8 | 12 |
| Iron Powder_____ | | 5 | 5 | 5 |
| Sodium silicate_____ | 12 | 11 | 11 | 11 |
| Total_____ | 100 | 100 | 100 | 100 |

It is clearly possible to distinguish the Type 308 electrode from the Type 347 electrodes of the various sizes.

FIGURES 1 and 2 both show the same core wire 20 but the flux layer 21 on the outside in FIGURE 1 is that suitable for Type 308 welding while the flux layer 21' in FIGURE 2 is suitable for Type 347 welding. FIGURE 3 shows schematically one type of flow arrangement involving the invention. The core wire 20 is supplied from a coil or other source in a direction indicated by the arrow 23. The electrode coating 21 or 21' is selectively applied to the core wire 20 at 24. Powdered iron 25 is added to the coating 21' in accordance with the teachings of the invention. Electrodes containing coating 21 are assembled at 26, and electrodes containing type 21' coatings are assembled at 27. It should be understood that only one coating, either 21 or 21' is applied at any given time, and that every effort is made to keep the coated electrodes properly segregated. The coated electrodes are then suitably marked with identification at position 28. The electrodes are then tested by means of eddy currents at 30 in accordance with the invention to determine whether any mix-up has occurred, and to determine whether the electrodes are properly identified.

The eddy current equipment used may be of any well known type, for example of the character described in published operating instructions of Magnaflux Corp. Magnatest FS 200 or that described in U.S. Patent No. 2,942,178 granted June 21, 1960 for Testing Circuit. Eddy current equipment utilizes eddy currents induced in the part being tested to change the current in the surrounding coil. Alternating current is generated by an oscillator within the instrument and is supplied to the primary windings of both coils. Any differential voltage in the coils is observed to determine differences between parts.

In view of my invention and disclosure, variations and modifications to meet individual whim or particular need will doubtless become evident to others skilled in the art to obtain all or part of the benefits of my invention without copying the process shown, and I, therefore, claim all such insofar as they fall within the reasonable spirit and scope of my claims.

Having thus described my invention what I claim as new and desire to secure by Letters Patent is:

1. The method of distinguishing between welding electrodes which have similar compositions of metallic core wire using eddy current testing, which comprises adding powdered iron to one of either a first or second electrode coating composition, coating a first electrode with the first composition, coating a second electrode with the second composition, subjecting the first electrode to eddy current testing and obtaining a first eddy current response and subjecting the second electrode to said eddy current testing and obtaining a second eddy current response different from the first eddy current response.

2. The method of claim 1, in which the electrode coating which contains the powdered iron also contains ferrocolumbium.

3. The method of claim 1, in which the quantity of iron powder in the electrode coating to which the powdered iron is added is between 3 and 10% by weight of said coating.

4. The method of distinguishing between welding electrodes of a first type and of a second type, which otherwise have similar responses to eddy currents and which have a core wire of stainless steel of the same composition which comprises coating the first type electrode with a first coating, coating the second type of electrode with a second coating, one only of said first or second coatings containing from 3 to 10% of powdered iron, and subjecting both first and second type of electrodes to eddy current testing to distinguish the first type of electrode from the second type of electrode.

References Cited by the Examiner

UNITED STATES PATENTS

| | | | |
|---|---|---|---|
| 2,237,254 | 4/1941 | Broekhuysen | 324—40 |
| 2,372,321 | 3/1945 | Griffiths | 209—214 |
| 2,824,817 | 2/1958 | Shutt | 219—146 |
| 2,894,203 | 7/1959 | Cory | 324—40 |
| 2,990,512 | 6/1961 | Gewartawski | 324—38 |
| 3,047,708 | 7/1962 | Start | 219—146 |
| 3,057,477 | 10/1962 | Rappaport | 209—215 |

WALTER L. CARLSON, *Primary Examiner.*

JAMES W. LAWRENCE, *Examiner.*